(12) United States Patent
Kang et al.

(10) Patent No.: US 9,117,055 B2
(45) Date of Patent: Aug. 25, 2015

(54) METHOD AND APPARATUS FOR DOWNLOADING DRM MODULE

(75) Inventors: Bo-Gyeong Kang, Gyeonggi-do (KR); Sanjeev Verma, San Jose, CA (US); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 338 days.

(21) Appl. No.: 13/271,574

(22) Filed: Oct. 12, 2011

(65) Prior Publication Data

US 2012/0090034 A1    Apr. 12, 2012

Related U.S. Application Data

(60) Provisional application No. 61/392,285, filed on Oct. 12, 2010.

(51) Int. Cl.
*G06F 21/10*    (2013.01)

(52) U.S. Cl.
CPC ........ *G06F 21/10* (2013.01); *G06F 2221/0728* (2013.01); *G06F 2221/2137* (2013.01)

(58) Field of Classification Search
CPC ...................................................... G06F 21/10
See application file for complete search history.

(56) References Cited

U.S. PATENT DOCUMENTS

| 8,489,885 B2 * | 7/2013 | Wang et al. ................... 713/176 |
| 2004/0025058 A1 * | 2/2004 | Kuriya et al. ................. 713/201 |
| 2005/0120212 A1 * | 6/2005 | Kanungo et al. ............. 713/170 |
| 2005/0138357 A1 * | 6/2005 | Swenson et al. ............. 713/155 |
| 2006/0212943 A1 * | 9/2006 | Kitazato et al. ................. 726/26 |
| 2007/0219921 A1 | 9/2007 | Lee et al. |
| 2008/0154778 A1 | 6/2008 | Lee et al. |
| 2008/0250508 A1 | 10/2008 | Montague et al. |
| 2009/0012805 A1 | 1/2009 | Schnell et al. |
| 2009/0307489 A1 * | 12/2009 | Endoh ........................... 713/168 |
| 2009/0328230 A1 * | 12/2009 | Byun et al. ...................... 726/26 |
| 2010/0023927 A1 | 1/2010 | Yang et al. |
| 2010/0031033 A1 | 2/2010 | Kim et al. |
| 2010/0088235 A1 * | 4/2010 | Chatfield et al. ................ 705/59 |
| 2011/0173345 A1 * | 7/2011 | Knox et al. .................... 709/246 |

FOREIGN PATENT DOCUMENTS

| CN | 101025779 | 8/2007 |
| JP | 2005258927 A * | 9/2005 |

(Continued)

OTHER PUBLICATIONS

John A. Bocharov et al., "Portable encoding of audio-video objects, The Protected Interoperable File Format ( PIFF)", Microsoft Corporation, First Edition Sep. 8, 2009, Revised Mar. 9, 2010, 32 pages.*
ISO Base Media File Format, Wikipedia, the free encyclopedeia, Sep. 26, 2010, 8 pages.

(Continued)

*Primary Examiner* — Matthew Henning
(74) *Attorney, Agent, or Firm* — The Farrell Law Firm, P.C.

(57) ABSTRACT

A Digital Rights Management (DRM) service system providing digital content to which DRM technology is applied, when one or more DRM content is provided to a client device, download information for a DRM module capable of installing a DRM agent corresponding to a DRM system applied to the DRM content is provided together, making it possible for the client device to download the DRM module based on the download information, install the DRM agent, and use the DRM content.

8 Claims, 6 Drawing Sheets

(56) References Cited

FOREIGN PATENT DOCUMENTS

| KR | 2009014575 A | * | 2/2009 |
|----|--------------|---|--------|
| WO | WO 2008/108584 | | 9/2008 |
| WO | WO 2010058317 A1 | * | 5/2010 |

OTHER PUBLICATIONS

Chinese Office Action dated Dec. 24, 2014 issued in counterpart application No. 201180049134.7.

* cited by examiner

```
aligned(8) class ProtectionSystemSpecificHeaderBox extends
FullBox ('uuid',
        extended_type=0xd08a4f18-10f3-4a82-b6c8-32d8aba183d3,
        version=0, flags=0)
{
    unsigned int (8) [16]        SystemID;
    unsigned int (32)            DataSize;
    unsigned int (8) [DataSize]  Data;
}
```

FIG.6

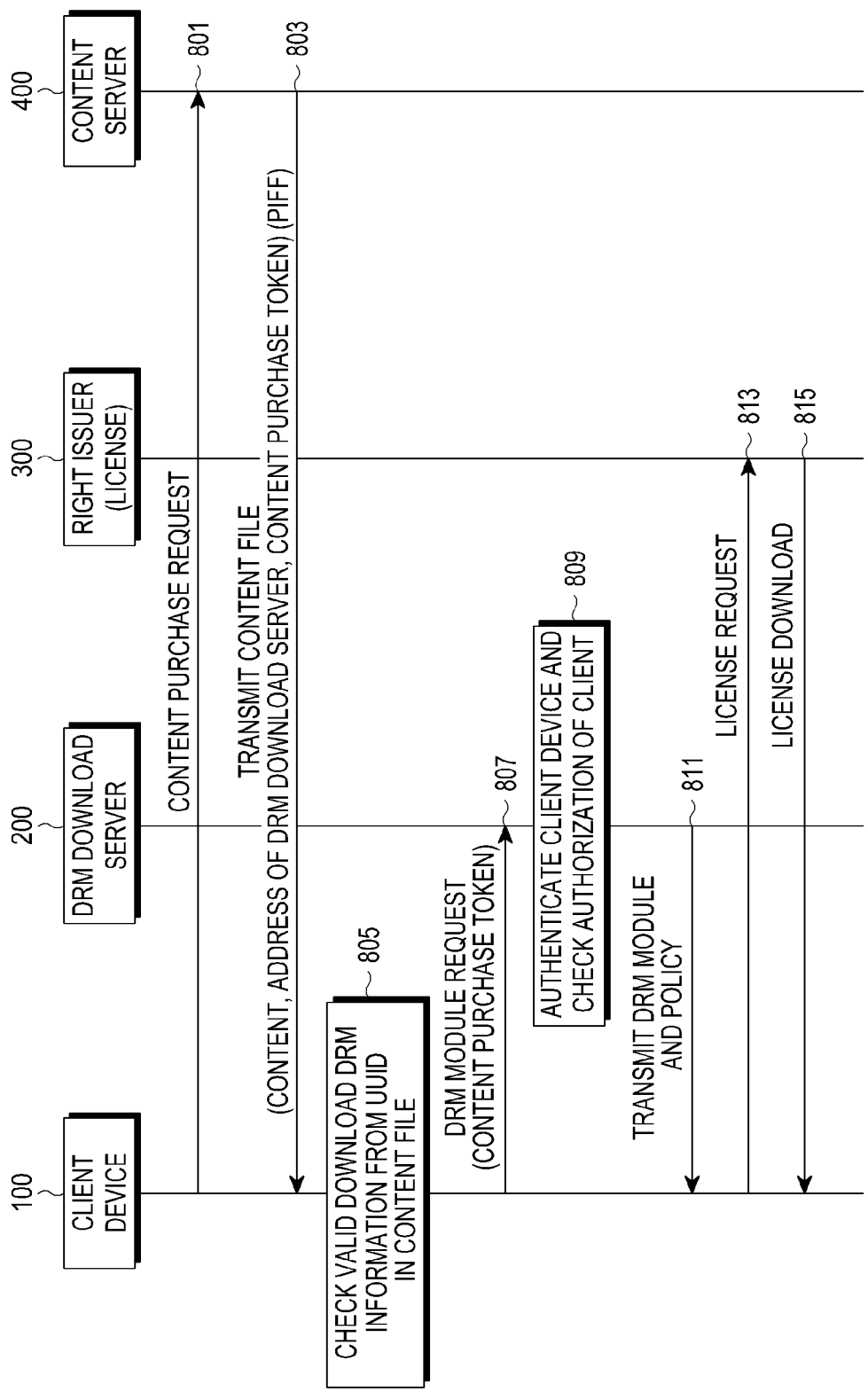

METHOD AND APPARATUS FOR DOWNLOADING DRM MODULE

PRIORITY

This application claims priority under 35 U.S.C. §119(e) to a United States Provisional Application filed in the United States Patent and Trademark Office on Oct. 12, 2010 and assigned Ser. No. 61/392,285, the entire disclosure of which is incorporated herein by reference.

BACKGROUND OF THE INVENTION

1. Field of the Invention

The present invention relates generally to Digital Rights Management (DRM), and more particularly, to a method and apparatus for providing a DRM service in a user terminal regardless of the type of a DRM system.

2. Description of the Related Art

DRM service is technology for continuously managing and protecting intellectual property rights of digital content using encryption technology for securely delivering a variety of content from a content provider to a user and preventing the user from illegally distributing the received content. DRM technology protects information throughout the entire life cycle of digital content from creation to distribution, use and disposal thereof, and may protect user rights not only in the online environment but also in the offline environment.

In order to use content to which DRM technology is applied ("DRM content") on a client device, the client device should first access a system providing the DRM content and download the DRM content, metadata for the DRM content, and a license. The metadata is data in which information about the DRM content is stored, and the license is data specifying an encryption key used to decrypt encrypted DRM content and access rights (for example, the number of accesses, period, etc.) to the DRM content. After the DRM content and the license are completely downloaded through this process, the client device allows the user to use the DRM content. Therefore, in order for the user to use DRM content, a DRM agent capable of executing a DRM solution should be implemented in the client device.

Presently, there are many different types of DRM systems on the market, such as an Open Mobile Alliance (OMA) DRM system, a Marlin DRM system, and a Widevine DRM system are available. These DRM systems are similar in terms of encrypting digital content before its delivery and granting access rights to the digital content, i.e., in terms of using a license, but they are different in the language or format expressing the license, and also different in the format of a message used for execution of the DRM service. Therefore, when the DRM system used by a content provider is different from the DRM system supported by the client device, incompatibility issues arise.

Accordingly, multiple DRM systems are applied to a license for DRM content, and information about the multiple DRM systems is provided together with the DRM content provided to the client device. The client device acquires a license based on information about a DRM system corresponding to a DRM agent installed therein among the multiple DRM systems, and runs the DRM content.

Problems arise when a client device has no DRM agent installed or does not support a DRM system applied to the content. Therefore, a method for using DRM content in such situations is required. That is, when DRM content is provided to a client device, information about a DRM system applied to digital content and information on a DRM module are downloaded, and provided together to the client device, and based on the information, the client device may download the DRM module and then use the DRM content.

Currently, however, a DRM download mechanism may not be handled through the file format used for providing DRM content. For example, Protected Interoperable File Format (PIFF) is the latest file format for signaling, which may be used when multiple DRM systems are applied to DRM content. When DRM content is delivered using a PIFF file, it may be assumed that one or more DRM systems are applied to DRM content. However, a client device may support none of the multiple DRM systems in which case the client device will not be able to use the DRM content because information about the multiple DRM systems is only included in the PIFF file.

Accordingly, there is a need to support DRM protection signaling that may be downloaded using the popular file formats.

SUMMARY OF THE INVENTION

Accordingly, the present invention has been made to solve the above-mentioned problems occurring in the prior art, and the present invention provides a method and apparatus for allowing a client device to download a DRM module corresponding to a DRM system applied to DRM content, install a DRM agent, and run the DRM content.

According to another aspect of the present invention, there is provided a method and apparatus for allowing a client device to run DRM content, by defining a file format such that download information for a DRM module may be included in a file used for providing DRM content.

In accordance with an aspect of the present invention, there is provided a method for downloading a Digital Rights Management (DRM) module by a client device in a service system providing DRM content. The method includes receiving a content file including DRM content in response to a request for purchase of the DRM content; acquiring DRM download information included in the content file and corresponding to at least one DRM system applied to the DRM content; requesting a DRM module from a DRM download server based on identification information of the DRM system, included in the DRM download information, and address information indicating a location of the DRM module corresponding to the DRM system; receiving the DRM module from the DRM download server, and installing a DRM agent corresponding to the DRM system using the DRM module; acquiring a license corresponding to the DRM system using the DRM agent based on license acquisition information included in the content file; and decrypting the DRM content using the license.

In accordance with another aspect of the present invention, there is provided a client device for downloading a Digital Rights Management (DRM) module in a service system providing DRM content. The client device includes a controller for receiving a content file including DRM content in response to a request for purchase of the DRM content, acquiring DRM download information included in the content file and corresponding to at least one DRM system applied to the DRM content, and delivering, to a download agent, identification information of the DRM system, included in the DRM download information, and address information indicating a location of a DRM module corresponding to the DRM system; the download agent for, under control of the controller, generating a DRM module request message for requesting download of the DRM module based on the identification information of the DRM system and the address information, sending the DRM module request message to a DRM download server, and installing a DRM agent corresponding to the DRM system using the DRM module upon receiving the DRM module from the DRM download server; and the DRM agent for, under control of the controller, acquiring a license corresponding to the DRM system based on license acquisition information included in the content file, and decrypting the DRM content using the license.

BRIEF DESCRIPTION OF THE DRAWINGS

The above and other aspects, features and advantages of various embodiments of the present invention will be more apparent from the following description taken in conjunction with the accompanying drawings, in which:

FIG. 6 is a diagram which illustrates information included in ProtectionSystemSpecific header field according to an embodiment of the present invention; and FIGS. 7 and 8 are diagrams which illustrate a process of downloading a DRM module according to an embodiment of the present invention.

Throughout the drawings, the same drawing reference numerals may refer to the same elements, features and structures.

DETAILED DESCRIPTION OF THE EMBODIMENTS OF THE PRESENT INVENTION

Various embodiments of the present invention will be described in detail with reference to the accompanying drawings. In the following description, specific details such as detailed configuration and components are merely provided to assist the overall understanding of various embodiments of the present invention. Therefore, it should be apparent to those of ordinary skill in the art that various changes and modifications of the embodiments described herein can be made without departing from the scope and spirit of the invention. In addition, descriptions of well-known functions and constructions are omitted for clarity and conciseness.

In accordance with an embodiment of the present invention, in a DRM service system providing digital content to which DRM technology is applied (hereinafter referred to as "DRM content"), when one or more DRM content is provided to a client device, download information (hereafter referred to as "DRM download information") for a DRM module capable of installing a DRM agent corresponding to a DRM system applied to the DRM content is provided together, to allow the client device to download the DRM module based on the download information, install the DRM agent, and run the DRM content.

DRM download information is included in a file used for providing DRM content (i.e., a content file), and in order to allow a client device to identify and use the DRM download information, a file format of the content file may be newly defined according to an embodiment of the present invention.

In accordance with an embodiment of the present invention, PIFF may be used as a file format of the content file, and the PIFF may be modified to deliver DRM download information.

Accordingly, a PIFF content file may include a Universally Unique Identifier (UUID) field representing the support to download a specific DRM module. The UUID field may include a UUID representing identification information for the DRM module. The PIFF may also include Universal Resource Locator (URL) information for a DRM download server, used for allowing a client device to send a download request for a DRM module and DRM policy, purchase information (for example, a purchase token) verifying the purchase of DRM content, and a purchase token field in which the purchase information is stored.

Figure 1:
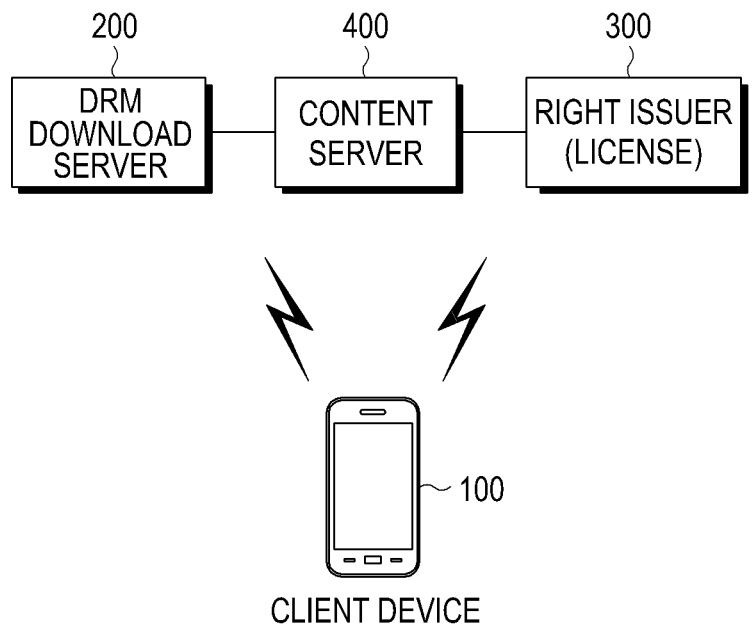
FIG. 1 is a diagram which illustrates a configuration of a DRM service system according to an embodiment of the present invention.

FIG. 1 is a diagram illustrating a configuration of a DRM service system according to an embodiment of the present invention.

Referring to FIG. 1, the DRM service system includes a DRM download server 200, a content server (or content providing server) 400, a right issuer (or right issuing server) 300, a client device 100.

The right issuer 300 is a device for creating and managing a license corresponding to individual content in cooperation with the content server 400, and providing the license to the client device 100. The license is data specifying an encryption key used to decrypt encrypted DRM content and access rights (for example, the number of accesses, period, etc.) to the DRM content.

The DRM download server 200 provides to the client device 100 a DRM module capable of installing a DRM agent corresponding to a DRM system used for creating a license. Here, it is assumed that the DRM download server 200 provides a DRM module corresponding to the DRM system supported by the right issuer 300.

Figure 2:
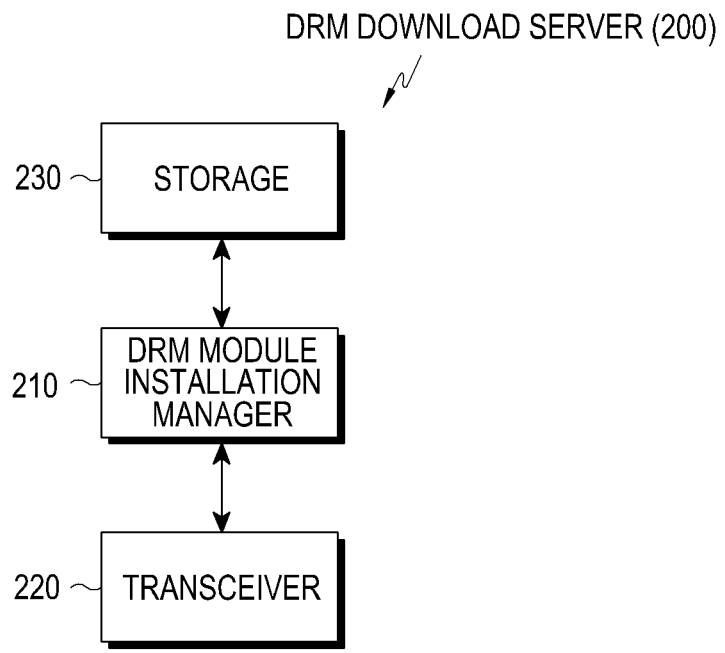
FIG. 2 is a diagram which illustrates a structure of a DRM download server according to an embodiment of the present invention.

FIG. 2 is a diagram illustrating a structure of a DRM download server according to an embodiment of the present invention.

Referring to FIG. 2, the DRM download server 200 includes a DRM module installation manager 210, a transceiver 220, and a storage 230.

The transceiver 220 transmits and receives messages or data to/from the network or other devices, and delivers the received messages or data to the DRM module installation manager 210. The transceiver 220 transmits data and messages received from the DRM module installation manager 210 to a relevant network entity or device.

The storage 230, e.g., a memory device, stores user information and client device information used for providing DRM service. The storage 230 stores a control program for the DRM download server 200, reference data, and various updatable data. The storage 230 stores a DRM module capable of installing a DRM agent corresponding to the DRM system supported by the right issuer 300, and also stores DRM policy. For example, an OMA DRM module and a DRM policy are stored in the storage 230. In addition, the storage 230 stores reference information to which reference is made to select a DRM module to be provided to a user terminal. The reference information may include, for example, information about a DRM module that is available according to the system performance of the client device 100.

The DRM module installation manager 210 authenticates the client device 100 at the request of the client device 100, determines whether it has right to install a DRM module in the client device 100, grants access rights to the DRM module depending on the determination results, selects a DRM module to be provided to the client device 100, and delivers the selected DRM module.

Although the right issuer 300 and the DRM download server 200 are illustrated as separate devices, they may be included in a single server.

Additionally, although one right issuer 300 and one DRM download server 200 are illustrated in FIG. 2, multiple right issuers and DRM download servers corresponding to various types of DRM systems may be provided in the DRM service system, and each of the right issuers and DRM download servers may be similar in the operation according to the present invention.

Referring back to FIG. 1, the content server 400 is a device for providing various types of digital content to the user terminal, and managing information about a user having subscribed to the service and information about the associated user terminal. The content server 400 encrypts DRM content in cooperation with the right issuer 300 to provide the DRM content, and when providing the DRM content to the client device 100, the content server 400 provides information, based on which a required license may be acquired, as well.

In accordance with an embodiment of the present invention, the content server 400 provides, to the client device 100, information (i.e., DRM download information) required to download a DRM module corresponding to a DRM system applied to DRM content. The DRM download information includes identification information for a DRM system, and address information (for example, URL information of the DRM download server 200) based on which a DRM module may be downloaded. The DRM download information may be received from the right issuer 300, or may be stored in the content server 400 in advance.

When the client device 100 requests and purchases DRM content, the content server 400 provides purchase information (for example, a purchase token) verifying the purchase of the DRM content, to the client device 100.

When provided to the client device 100, the DRM content is included in a content file, and may include license acquisition information, DRM download information, and purchase information. For example, the content file may be configured in the PIFF format. Further, a content file may include types of one or more DRM systems applied to DRM content, and license acquisition information corresponding to each of the DRM systems. Also, the content file may include DRM download information corresponding to at least one of the DRM systems.

Figure 3:
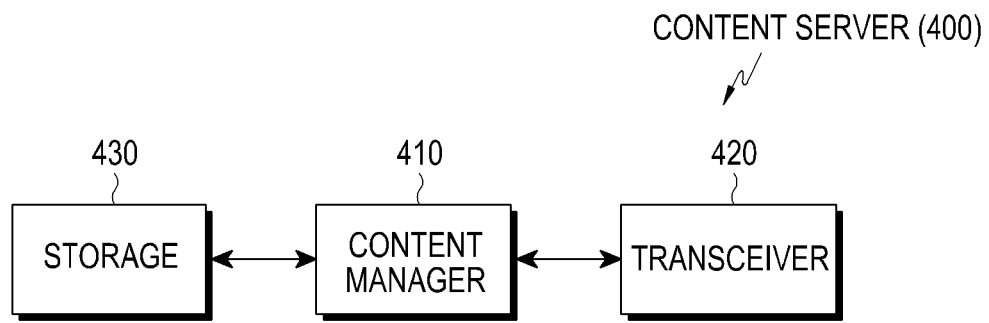
FIG. 3 is a diagram which illustrates a structure of the content server according to an embodiment of the present invention.

A structure of the content server 400 is shown in FIG. 3. Referring to FIG. 3, the content server 400 includes a content manager 410, a transceiver 420, and storage 430.

The transceiver 420 transmits and receives messages or data to/from the network or other devices, and delivers the received messages or data to the content manager 410. The transceiver 420 transmits data and messages received from the content manager 410 to a relevant network entity or device.

The storage 430, e.g. a memory device, stores various content, and stores user information and client device information used for providing DRM service. The storage 430 stores a control program for the content server 400, reference data, and various updatable data.

The content manager 410 authenticates the client device 100 in response to a DRM content purchase request from the client device 100, and if the authentication is successful, the content manager 410 encrypts the content in cooperation with the right issuer 300 to provide the DRM content. The content manager 410 creates a content file, e.g., a PIFF content file, and provides it to the client device 100.

In accordance with an embodiment of the present invention, DRM download information may be included in a ProtectionSystemSpecific header field of a PIFF content file. Accordingly, a UUID field may be defined in the ProtectionSystemSpecific header field. The UUID field is a field representing the support to download a specific DRM module, and the UUID field includes a UUID representing identification information for the DRM module.

The ProtectionSystemSpecific header field includes URL information for a DRM download server to allow the client device 100 to send a download request for DRM module and DRM policy.

In addition, the ProtectionSystemSpecific header field may include a purchase token field, in which purchase information (for example, a purchase token) verifying the purchase of the DRM content is stored.

A PIFF content file may also include a ProtectionSystemSpecific header field corresponding to each of all DRM systems available for content decryption. Accordingly, license acquisition information may be included in the ProtectionSystemSpecific header field.

Figure 5:
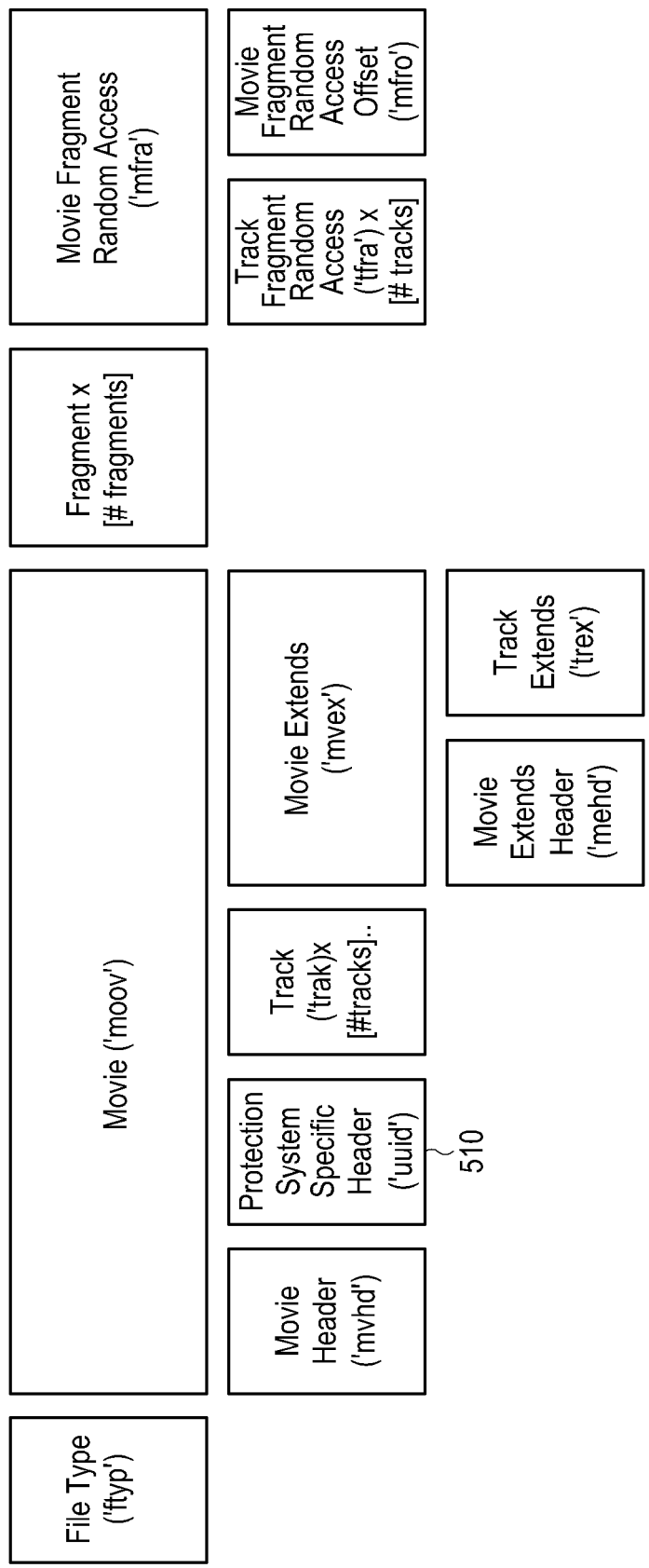
FIG. 5 is a diagram which illustrates a structure of a content file according to an embodiment of the present invention.

A structure of a PIFF content file is illustrated in FIG. 5. Specifically, FIG. 5 is a diagram illustrating a structure of a content file with movie content according to an embodiment of the present invention, in which a ProtectionSystemSpecific header field 510 with a UUID is included.

Information included in a ProtectionSystemSpecific header field according to an embodiment of the present invention may be represented as shown in FIG. 6.

Referring back to FIG. 1, the client device 100 requests and purchases DRM content, and executes the DRM content, thereby using DRM content. The client device 100 may include, for example, personal computers, televisions, mobile phones, Portable Multimedia Players (PMPs), and music file players.

In accordance with an embodiment of the present invention, the client device 100 requests and purchases specific DRM content, and receives its content file. The client device 100 analyzes the received content file, and determines types of one or more DRM systems applied to the specific content file, and if there is a supportable DRM system, the client device 100 acquires a license corresponding to the DRM system, and plays the specific DRM content.

However, if there is no DRM system supported by the client device 100 as a result of determining types of one or more DRM systems applied to the specific content file, then the client device 100 checks a UUID field included in a ProtectionSystemSpecific header field, and determines the presence/absence of a downloadable DRM module. The client device 100 acquires identification information for a downloadable DRM module from the UUID field, acquires address information, based on which a DRM module may be downloaded, from the ProtectionSystemSpecific header field, and sends a download request for the DRM module to the DRM download server. The DRM module request may include purchase information for specific DRM content.

Thereafter, the client device 100 downloads a DRM module, installs its associated DRM agent, acquires a required license from the right issuer 300 using the DRM agent, and plays the specific DRM content.

Figure 4:
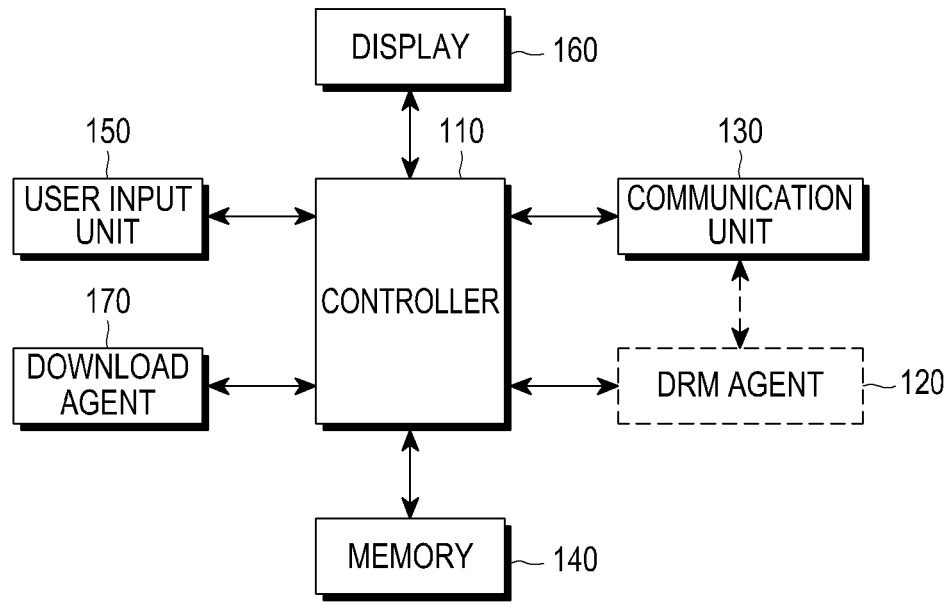
FIG. 4 is a diagram which illustrates a structure of a client device according to an embodiment of the present invention.

Referring to FIG. 4, which illustrates a structure of the client device 100, the client device 100 includes a controller 110, a communication unit 130, a memory 140, a user input unit 150, a display 160, and a download agent 170. The client device 100 may include a DRM agent 120.

The controller 110, which controls the overall operation of the client device 100, performs the above-described operation of the client device 100 to acquire a license, and controls operation of each component according thereto. Accordingly, the controller 110 generates a content purchase request message and analyzes a received content file.

The communication unit 130 transmits and receives messages or data to/from the network or other devices, and delivers the received messages or data to the controller 110 or the DRM agent 120.

The user input unit 150, which is a component providing an interface between the user and the client device 100, delivers data received from the user to the controller 110.

The memory 140 stores a handling and controlling program for the controller 110, reference data, and various updatable data, and is provided as a working memory for the controller 110.

The display 160 displays various data and DRM content under control of the controller 110.

The DRM agent 120 is a software component that controls an operation of applying DRM during running of DRM content, under control of the controller 110. Accordingly, the DRM agent 120 requests a license associated with specific DRM content through the communication unit 130, analyzes a received license, and delivers appropriate information to a DRM content running unit (not illustrated), thereby allowing the DRM content to execute.

The DRM agent 120 may exist independently to correspond to the type of DRM system supported by the client device 100, and in some cases, does not have to be installed in the client device 100 in advance. Therefore, in accordance with an embodiment of the present invention, the DRM agent 120 is configured when the download agent 170 installs a DRM module. The DRM agent 120 may be configured as an individual agent for each of DRM technologies, or may be a single integrated DRM agent. Even though the DRM agent 120 is an integrated DRM agent, it may include sub DRM agents therein to process DRM data corresponding to different types of DRM systems, and these sub DRM agents may be generated by downloading associated DRM modules. In addition, even when the latest version of DRM technology should be applied, its associated DRM module should be installed if necessary, and the installation of the DRM module is achieved by the controller 110.

The download agent 170, under control of the controller 110, downloads a specific DRM module from the DRM download server 200 and installs the DRM module.

Figure 7:
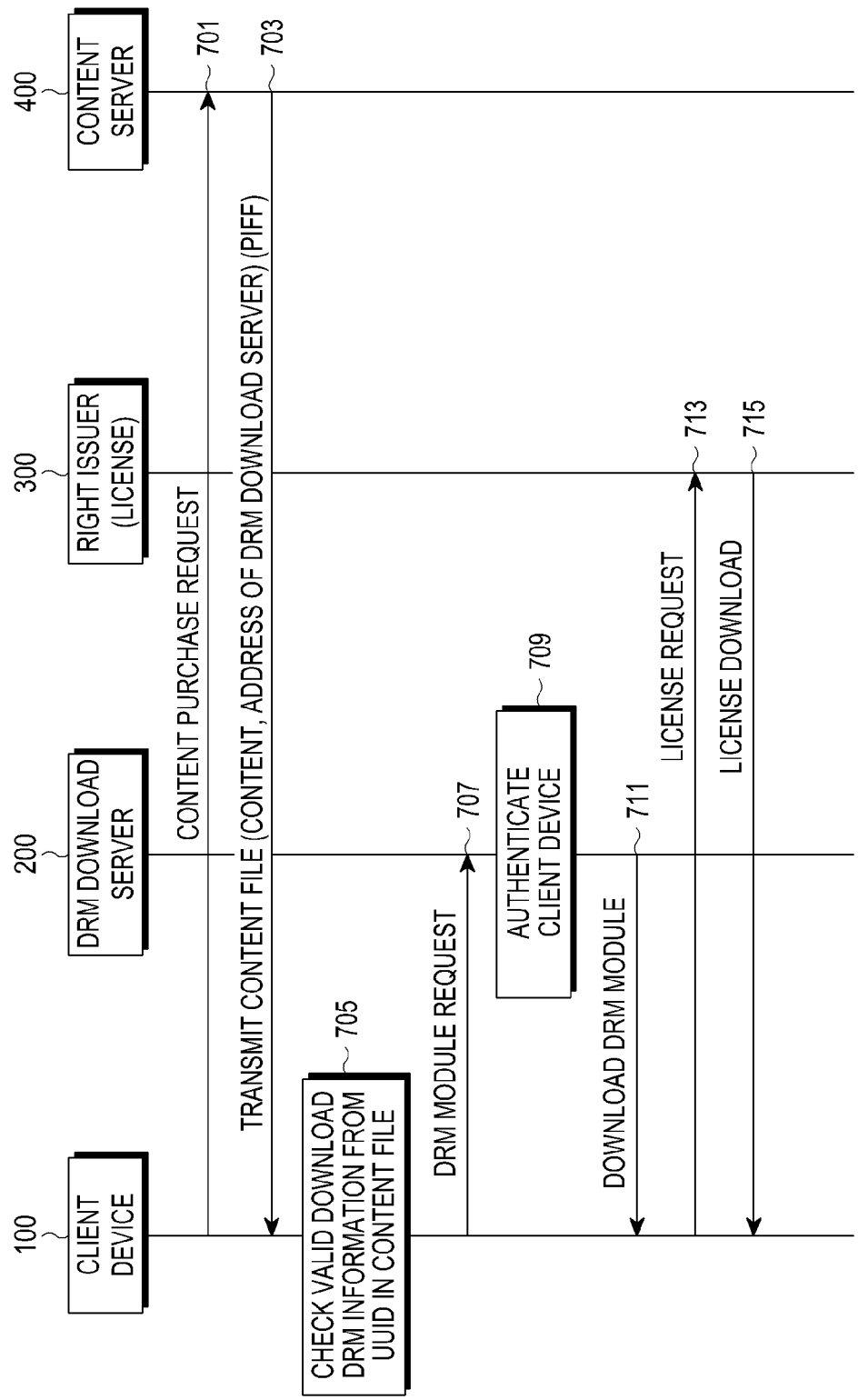

FIGS. 7 and 8 are diagrams which illustrate a process of downloading a DRM module according to an embodiment of the present invention. Specifically, FIG. 7 is a diagram illustrating a process of downloading a DRM module without using purchase information according to an embodiment of the present invention, and FIG. 8 is a diagram illustrating a process of downloading a DRM module using purchase information according to an embodiment of the present invention.

Referring to FIG. 7, the client device 100 generates a content purchase request message to purchase specific DRM content at the request of the user and sends it to the content server 400, in step 701.

Upon receiving the content purchase request message, the content server 400 authenticates whether the client device 100 is qualified to purchase the specific DRM content. If the authentication was successful, the content server 400 creates a content file including the DRM content. For example, the content file may be created in a PIFF format according to an embodiment of the present invention, and may include types of various DRM systems associated with the specific DRM content, license acquisition information corresponding to the various DRM systems, and DRM download information corresponding to at least one of the various DRM systems. In addition, the content file may include purchase information.

In step 703, the content server 400 transfers the content file to the client device 100. Upon receiving the content file, the controller 110 of the client device 100 analyzes the content file and determines if there is any DRM system supported by the client device 100 among the DRM systems applied to the specific DRM content, in step 705. If there is no DRM system supported by the client device 100, the controller 110 determines the presence/absence of a downloadable DRM module based on a UUID field of the content file, and acquires DRM download information for the DRM module. For example, the client device 100 may acquire identification information for the DRM module, and download address information of the DRM module. In FIG. 7, it is assumed that the DRM download address information acquired from the content file corresponds to the DRM download server 200.

In step 707, the controller 110 of the client device 100 delivers the acquired download information to the download agent 170. The download agent 170 generates a DRM module request message for requesting download of the DRM module using the received information, and sends it to the DRM download server 200.

Upon receiving the DRM module request message from the client device 100, the DRM download server 200 performs authentication on the client device 100 in step 709. If the authentication is successful, the DRM download server 200 transmits the DRM module and its associated DRM policy to the client device 100 in step 711.

Upon receiving the DRM module, the download agent 170 of the client device 100 installs the received DRM module, thereby creating the DRM agent 120. The DRM agent 120 of the client device 100 checks the license acquisition information included in the content file to determine a location of the right issuer 300. The client device 100 generates a license request message using the DRM agent 120, and sends it to the right issuer 300 in step 713.

In step 715, the right issuer 300 transmits a requested license to the client device 100 upon request from the client device 100. The client device 100 decrypts and executes the DRM content using the acquired license.

Referring to FIG. 8, the client device 100 generates a content purchase request message to purchase specific DRM content at the request of the user and sends it to the content server 400, in step 801.

Upon receiving the content purchase request message, the content server 400 authenticates whether the client device 100 is qualified to purchase the specific DRM content. If the authentication was successful, the content server 400 creates a content file including the DRM content. For example, the content file may be created in a PIFF format, and may include types of various DRM systems associated with the specific DRM content, license acquisition information corresponding to the various DRM systems, and DRM download information corresponding to at least one of the various DRM systems. In addition, the content file may include purchase information verifying the purchase of the specific DRM content for the client device 100. The purchase information may be, for example, a purchase token.

In step 803, the content server 400 transfers the content file to the client device 100. Upon receiving the content file, the client device 100 analyzes the content file and determines if there is any DRM system supported by the client device 100 among the DRM systems applied to the specific DRM content, in step 805. If there is no DRM system supported by the client device 100, the client device 100 determines the presence/absence of a downloadable DRM module based on a UUID field of the content file, and acquires DRM download information for the DRM module. For example, the client device 100 may acquire identification information for the DRM module, and download address information of the DRM module. In FIG. 8, it is assumed that the DRM download address information acquired from the content file corresponds to the DRM download server 200.

In step 807, the client device 100 generates a DRM module request message for requesting download of the DRM module using the download agent 170, and sends it to the DRM download server 200. The DRM module request message includes purchase information.

Upon receiving the DRM module request message from the client device 100, the DRM download server 200 performs authentication on the client device 100 in step 809. If the authentication is successful, the DRM download server 200 determines if the client device 100 is qualified to use a purchase token, based on the purchase information included in the DRM module request message. That is, the DRM download server 200 determines whether the client device 100 is qualified to download the DRM module as it has normally purchased the specific DRM content. If the client device 100 is qualified to download the DRM module, the DRM download server 200 transmits the DRM module and its associated DRM policy to the client device 100 in step 811.

Upon receiving the DRM module, the download agent 170 of the client device 100 installs the received DRM module, thereby creating the DRM agent 120. The DRM agent 120 of the client device 100 checks the license acquisition information included in the content file to determine a location of the right issuer 300. The client device 100 generates a license request message using the DRM agent 120, and sends it to the right issuer 300 in step 813.

In step 815, the right issuer 300 transmits a requested license to the client device 100 upon request from the client device 100. The client device 100 decrypts and plays the DRM content using the acquired license.

As is apparent from the foregoing description, according to the above-described embodiments of the present invention, a client device may download a DRM module corresponding to a DRM system applied to DRM content, install its associated DRM agent, and play the DRM content. The preset invention may define a file format such that DRM module download information is included in a file used for providing DRM content, making it possible for the client device to play the DRM content.

While the present invention has been described with reference to various embodiments thereof, it is understood by those of ordinary skill in the art that various changes in form and detail may be made therein without departing from the spirit and scope of the invention as defined by the appended claims.

What is claimed is:

1. A method for downloading a Digital Rights Management (DRM) module by a client device in a service system providing DRM content, comprising:
   receiving, by the client device, a content file including the DRM content;
   acquiring, by the client device, DRM download information included in the content file, the DRM download information including a unique identifier of a DRM module and an address of a DRM download server;
   requesting, by the client device, the DRM module from the DRM download server having the address included in the DRM download information, by the client device transmitting to the DRM download server, a DRM module request message including the unique identifier of the DRM module included in the DRM download information and purchase information verifying a purchase of the DRM content;
   receiving, by the client device, the DRM module from the DRM download server;
   installing, by the client device, a DRM agent corresponding to a DRM system of the DRM content using the DRM module;
   acquiring, by the client device, a license corresponding to the DRM system using the DRM agent based on license acquisition information included in the content file; and
   decrypting, by the client device, the DRM content using the license.

2. The method of claim 1, wherein the content file includes the purchase information verifying the purchase of the DRM content.

3. The method of claim 1, further comprising:
   checking DRM systems applied to the DRM content included in the content file;
   requesting the DRM module from the DRM download server, if the client device does not support at least one DRM system applied to the DRM content.

4. The method of claim 1, wherein the content file has a format of a Protected Interoperable File Format (PIFF), and the DRM download information is included in a Protection System Specific header field of the content file.

5. A client device for downloading a Digital Rights Management (DRM) module in a service system providing DRM content, the client device comprising:
   a communication unit; and
   a controller configured to:
   receive a content file including the DRM content,
   acquire DRM download information included in the content file, the DRM download information including a unique identifier of a DRM module and an address of a DRM download server;
   request the DRM module from the DRM download server having the address included in the DRM download information, by the client transmitting to the DRM download server, a DRM module request message including the unique identifier of the DRM module included in the DRM download information and purchase information verifying a purchase of the DRM content;
   receive the DRM module from the DRM download server through the communication unit;
   install a DRM agent corresponding to a DRM system of the DRM content using the DRM module;
   acquire a license corresponding to the DRM system using the DRM agent through the communication unit based on license acquisition information included in the content file; and
   decrypt the DRM content using the license.

6. The client device of claim 5, wherein the content file includes the purchase information verifying the purchase of the DRM content.

7. The client device of claim 5, wherein the controller checks DRM systems applied to the DRM content included in the content file, and controls the download agent to generate the DRM module request message if the client device does not support at least one DRM system applied to the DRM content.

8. The client device of claim 5, wherein the content file has a format of a Protected Interoperable File Format (PIFF), and the DRM download information is included in a Protection System Specific header field of the content file.

* * * * *